Aug. 7, 1956　　　D. P. WORDEN ET AL　　　2,757,732
APPARATUS FOR CUTTING TUBING
Filed Dec. 29, 1950　　　　　　　　　　　　　　　7 Sheets-Sheet 1

INVENTORS
DONALD P. WORDEN
GLENN H. EASTMAN
BENJAMIN N. SNYDER
AND
VICTOR H. PAYNE
their ATTORNEYS Aug. 7, 1956  D. P. WORDEN ET AL  2,757,732
APPARATUS FOR CUTTING TUBING
Filed Dec. 29, 1950  7 Sheets-Sheet 2
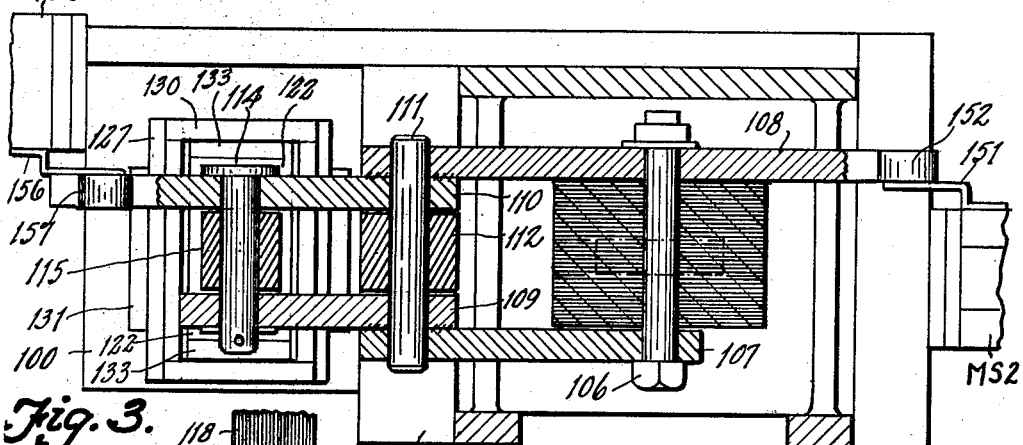
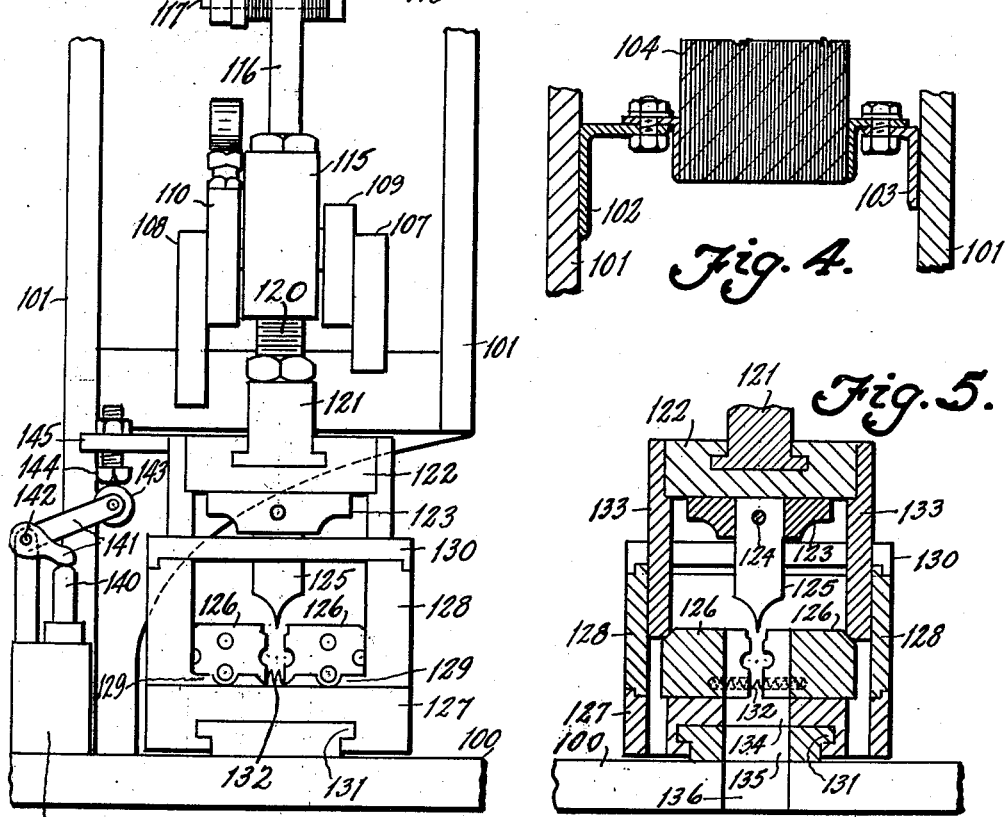
INVENTORS
DONALD P. WORDEN
GLENN H. EASTMAN
BENJAMIN N. SNYDER
AND
VICTOR H. PAYNE
By Willits, Hardman & Peles
their ATTORNEYS

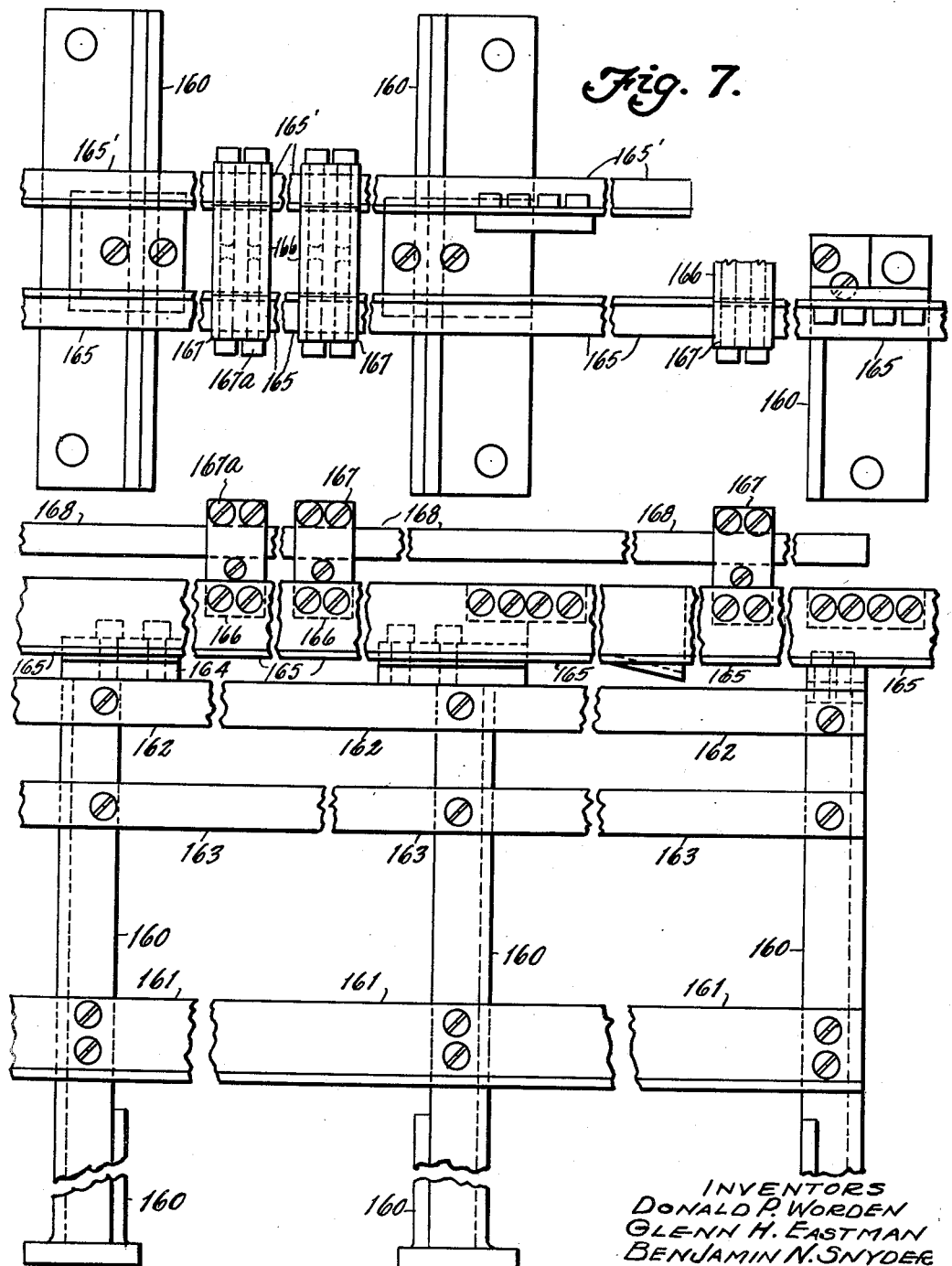

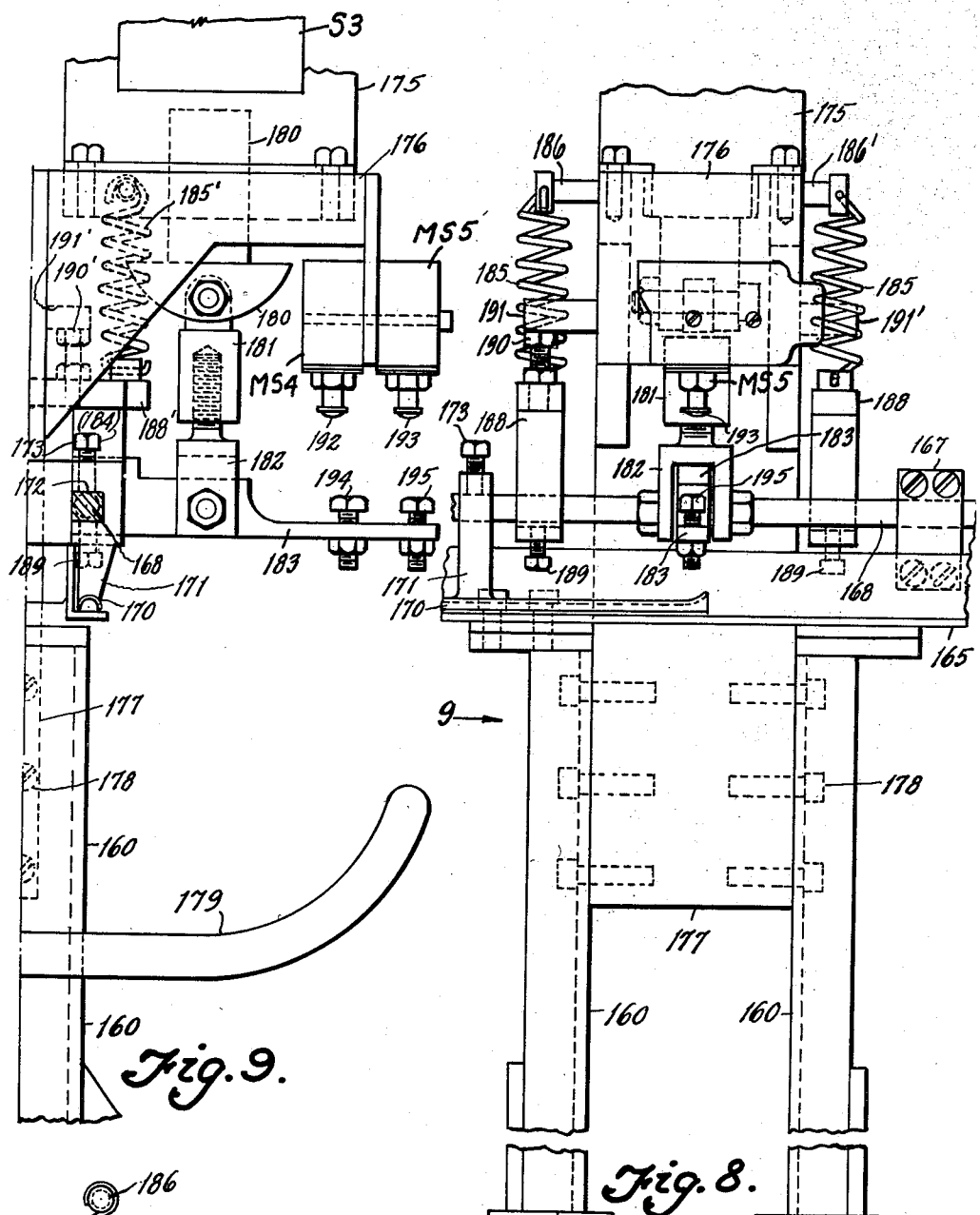
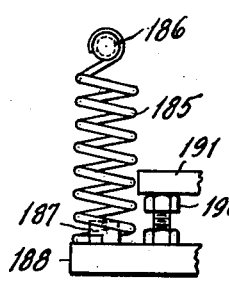
Fig. 9.
Fig. 8.
Fig. 9A.

Aug. 7, 1956 D. P. WORDEN ET AL 2,757,732
APPARATUS FOR CUTTING TUBING
Filed Dec. 29, 1950 7 Sheets-Sheet 5
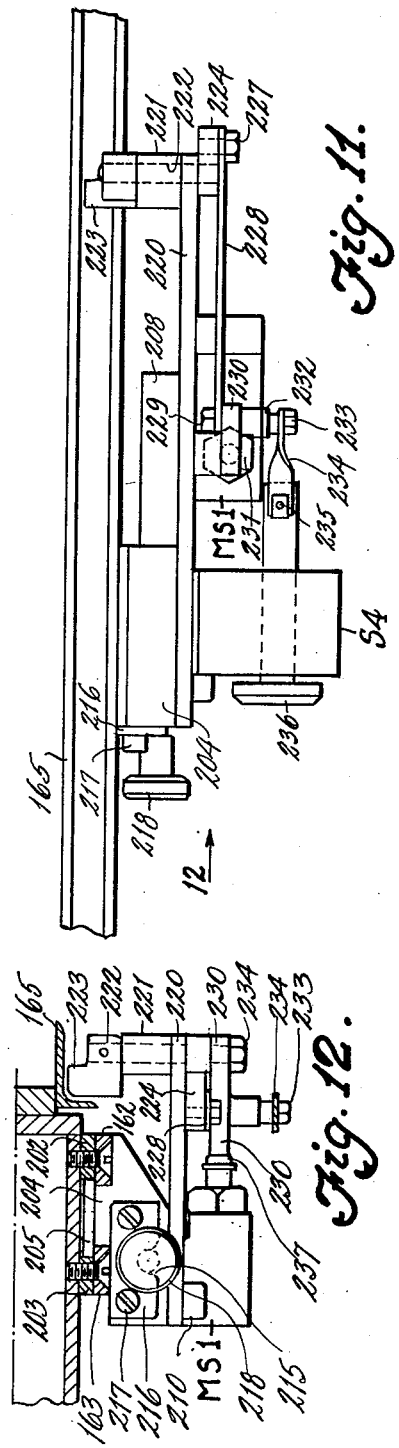
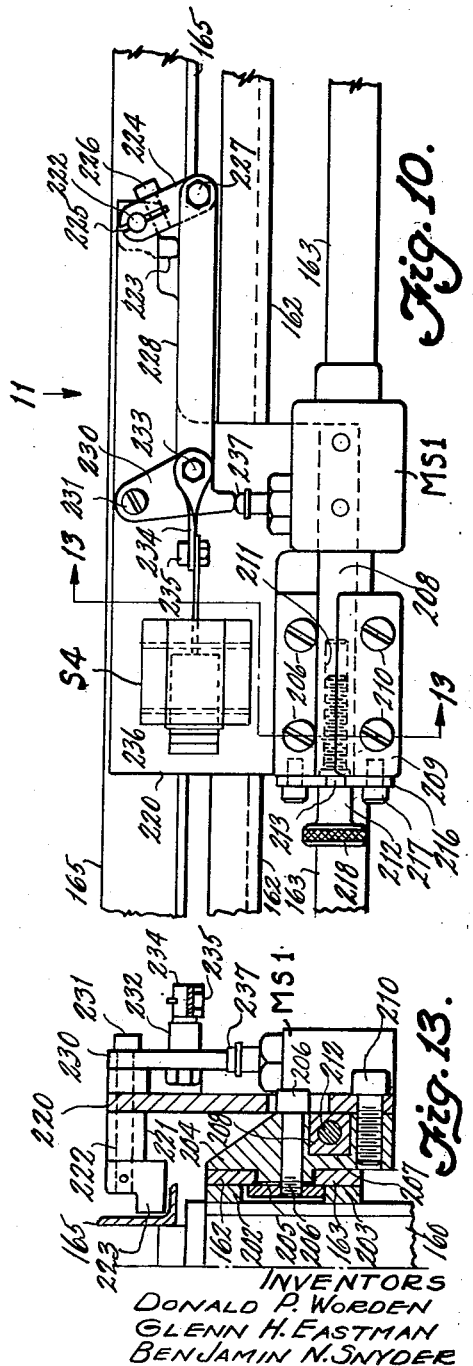
INVENTORS
DONALD P. WORDEN
GLENN H. EASTMAN
BENJAMIN N. SNYDER
AND
VICTOR H. PAYNE
By Willets, Hardman & Foley
their ATTORNEYS

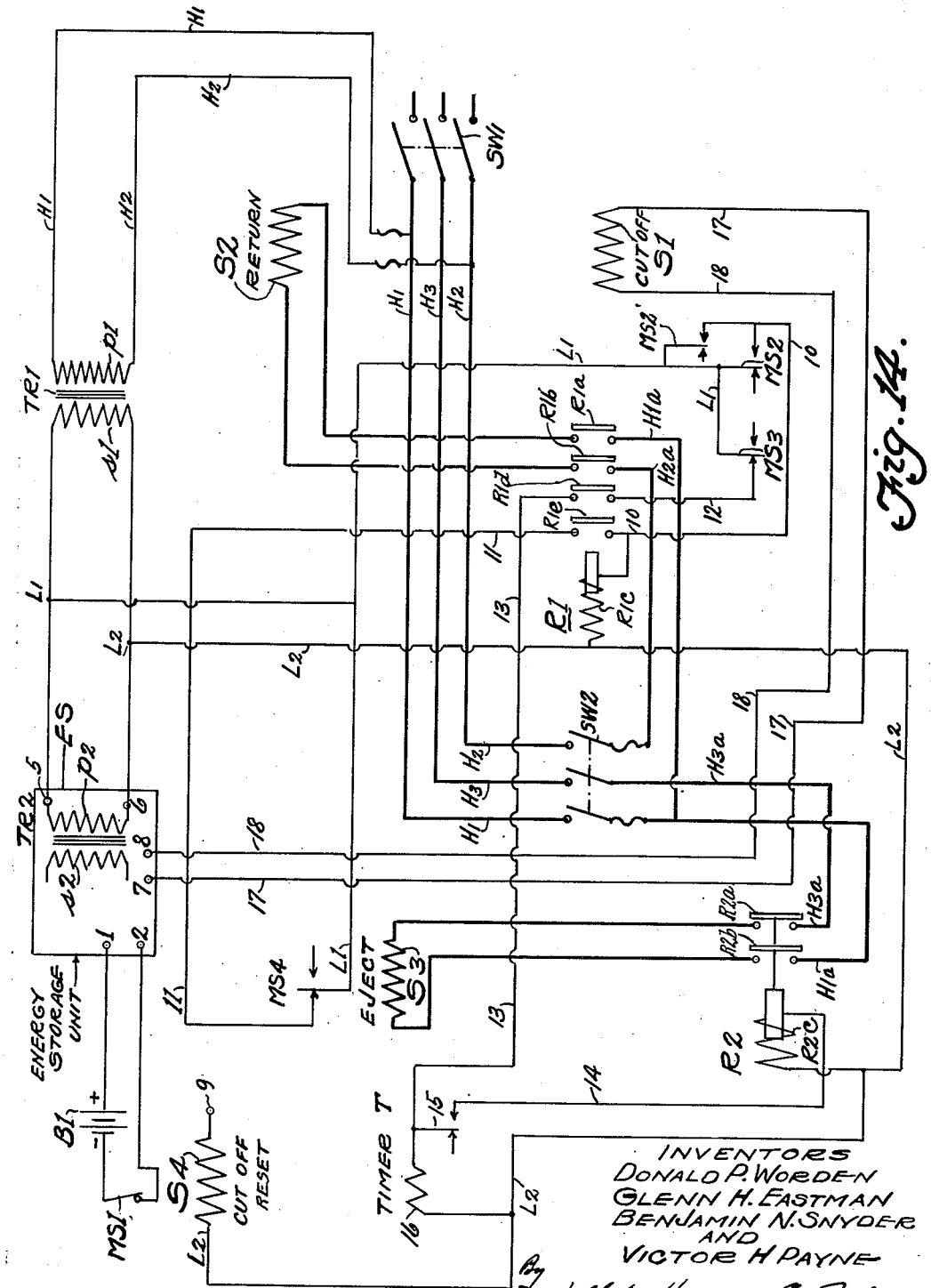

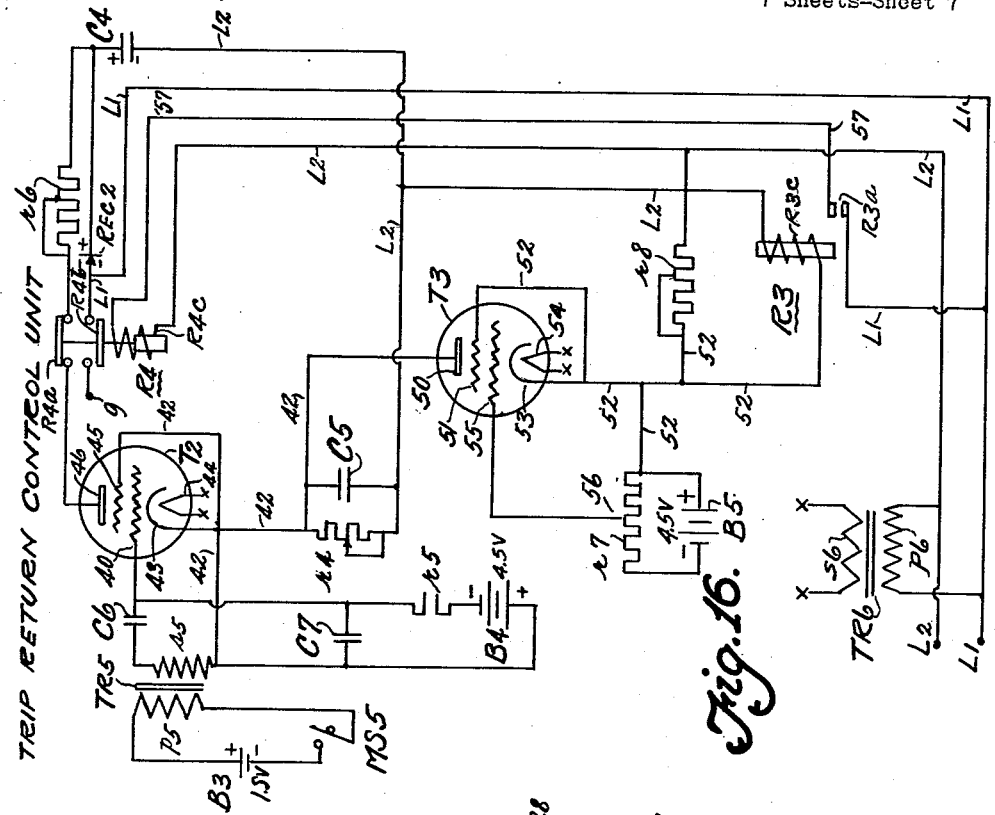

United States Patent Office 2,757,732
Patented Aug. 7, 1956

2,757,732

APPARATUS FOR CUTTING TUBING

Donald P. Worden, Glenn H. Eastman, Benjamin N. Snyder, and Victor H. Payne, Rochester, N. Y., assignors to General Motors Corporation, Detroit, Mich., a corporation of Delaware Application December 29, 1950, Serial No. 203,295

12 Claims. (Cl. 164—49)

This invention relates to apparatus for cutting tubing into lengths as it moves from a tube forming mill. In earlier apparatus of this kind there is a trigger member which is located at a predetermined distance from the tubing cutter and is adapted to be engaged by the end of the tubing as it comes out of the mill and this engagement of the free end of the tubing with the trigger will cause the cutter to sever the tubing into pieces of the desired length which is determined by the distance of the trigger from the cutter. Since the time interval between engagement with the trigger and the operation of the cutter is not always the same, the lengths of tubing will not be uniform. In order to secure greater uniformity, apparatus has been previously provided in which the cutter is moved bodily with the trigger in order that the lengths of tubing will be more uniform regardless of variation in the time interval between engagement of the tubing with the trigger member and operation of the cutter to sever the tubing.

An object of the present invention is to provide an apparatus which will be effective to cut the tubing into pieces of uniform length without requiring bodily movement of the cutter with the tubing. More specifically, it is an object of the invention to provide cutter operating means and control means therefor which will respond almost instantaneously to movement of the trigger by the tubing. To accomplish this object, the disclosed embodiment of the invention provides for operation of the cutter by a powerful electromagnet or solenoid which operates at high voltage from a condenser which is caused to discharge in a very brief interval of time after the tubing strikes the abutment member. The movement of the cutter to cut the tubing is followed almost instantaneously by retraction of the cutter, the lifting of the trigger and ejection of the cut tubing occurs after a lapse of time sufficient for the cut length of tubing to be moved by the uncut tubing to a location which is clear of the cutter.

Further objects and advantages of the present invention will be apparent from the following description, reference being had to the accompanying drawings wherein a preferred embodiment of the present invention is clearly shown.

In the drawings:

Fig. 2 is a fragmentary end view looking in the direction of arrow 2 of Fig. 1.

Figure 1:
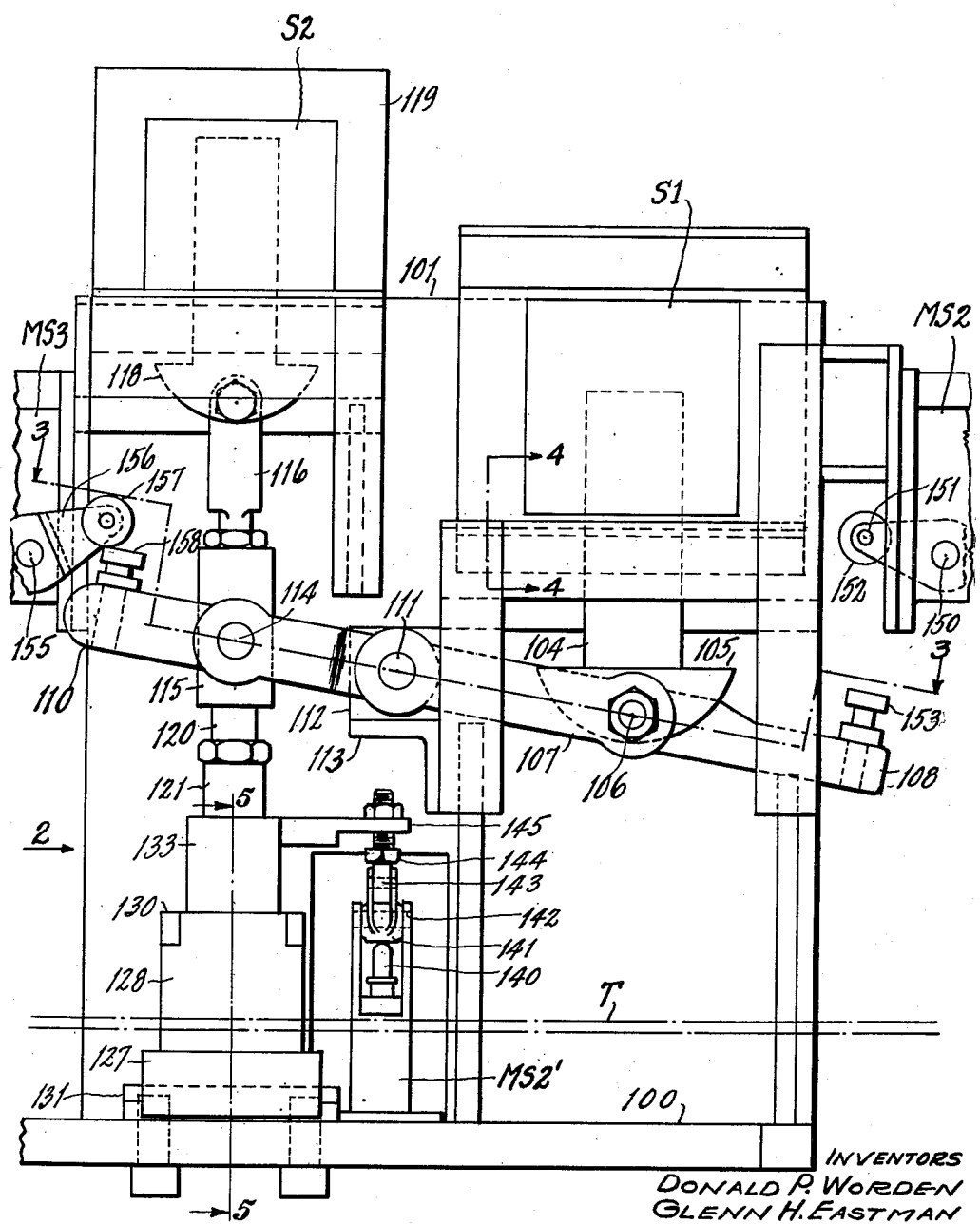
Fig. 1 is a side view of the tubing cutter advancing and retracting mechanism.

Figs. 3, 4 and 5 are fragmentary sectional views on lines 3—3, 4—4 and 5—5 of Fig. 1.

Figs. 6 and 7 are fragmentary side and top views respectively, of the tubing run-off table.

Fig. 8 is a fragmentary front view of the ejecting mechanism.

Figs. 9 and 9A constitute a view in the direction of arrow 9 of Fig. 8.

Fig. 10 is a fragmentary front view of the control trigger and actuating means therefor.

Fig. 11 is a view in the direction of arrow 11 of Fig. 10.

Fig. 12 is a view in the direction of arrow 12 of Fig. 11.

Fig. 13 is a sectional view on line 13—13 of Fig. 10.

Figs. 14, 15 and 16 are wiring diagrams of the electrical control of the apparatus.

Tubing cutter

Referring to Fig. 1, a base plate 100 supports a frame 101 which includes angles 102 and 103 (Fig. 4) which supports a solenoid magnet core 104 and solenoid coil S1 which, when energized, attracts upwardly an armature 105 connected by a bolt 106 (Fig. 3) with levers 107 and 108 welded respectively to levers 109 and 110, pivotally connected with a rod 111 supported by a block 112 mounted on an angle member 113, carried by the frame. Levers 109 and 110 are pivotally connected by the pin 114 with a block 115 connected by a link 116 and a bolt 117 with an armature 118 of a second solenoid. The armature is moved upwardly into the position shown in Fig. 1 by the energization of a solenoid coil S2 supported by solenoid core 119 carried by a frame 101 in a manner similar to the support of solenoid core 104.

Block 115 is connected by a screw 120 with a block 121, the lower end of which is received by a T-slot in a plate 122 supporting a plate 123 to which the pin 124 attaches a cutter blade 125. The tubing T, represented by parallel dot-dash lines in Fig. 1, moves toward the left, as viewed in such figure and between clamp blocks 126 guided for horizontal sliding movement transverse of the tube by a cutter-frame which includes a base 127, side members 128, end members 129 and bars 130, as best shown in Figs. 2 and 5. Base 127 has a T-slot receiving a T block 131 attached to base 100. Springs 132 urge the blocks 126 apart and into engagement with bars 133 attached to plate 122. When solenoid S1 is energized to move armature 104 upwardly, plate 122 moves down to cause blocks 126 to grip the tubing by virtue of the camming action of bars 133 on said blocks 126, and the blade 125 shears the tubing and any metal sheared off descends through holes 134, 135 and 136 in members 127, 133 and 100 respectively (Fig. 5). Retraction of the blade 125 and the separation of the clamps 126 immediately follows the cutting by virtue of energization of solenoid S2, S1 having been deenergized as will be described later. During downward movement of the plate 122 a switch MS2' (Fig. 1) is closed. This is effected by downward movement of its plunger 140 effected by clockwise movement of lever 141 pivoted at 142 and carrying a roller 143 engaged by a screw 144, adjustable in a plate 145 attached to plate 122. During upward movement of solenoid armature 104 which causes downward movement of plate 122, a switch MS2 is closed. This is effected by clockwise movement of a shaft 150 attached to a lever 151 carrying a roller 152 engaged by a screw 153 adjustably threaded through lever 108. During upward movement of solenoid armature 118, a switch MS3 is closed by virtue of counterclockwise rotation of a shaft 155 attached to a lever 156 carrying a roller 157 engaged by a screw 158 adjustable in lever 110.

Run off table

The tubing moves toward the left from the cutter shown in Fig. 1 to a run off table which is positioned to the left of the apparatus shown in Fig. 1 and is shown in Figs. 6 and 7. The table comprises vertical supporting members 160 to which are attached spacing angle members 161 and bars 162 and 163. The vertical members 160 support angle members 165 and 165'. There are two angle members 165 and 165' for the reason that the apparatus shown in Figs. 1–13 may be duplicated so that tubing from two mills can be cut into pieces of the desired length at the same time. Angle members 165 and 165' support blocks 166 which together with caps 167 attached by screws 167a provide bearings for shafts, one of which is indicated at 168 in Fig. 6. Referring to Fig. 9, the shaft 168 is generally square in cross section and has cylindrical portions 169 journaled in bearings provided by the caps 167.

Ejector

As the tubing passes to the left along the horizontal portion of angle member 165 (Fig. 8), it is moved under inverted U-shaped member 170 carried by a plurality of arms 171, each having a notch 172 which receives shaft 168. Screws 173 attach arms 171 to shaft 168. Ejection of the cut length of tubing is effected by counterclockwise rotation of shaft 168. This is effected by energization of a solenoid coil S3 supported by a core 175 which is supported by a bracket 176 which includes a vertical plate 177 attached by screws 178 to supporting members 160 (Figs. 8 and 9). When solenoid S3 is energized armature 180 moves up to effect, through connecting link members 181 and 182, counterclockwise movement of a lever 183 which has a notch in which shaft 168 is received and which is attached to said shaft by clamp screw 184. When solenoid S3 is deenergized, lever 183 is returned to the position shown by a spring 185 (Fig. 9A) connected with a fixed pin 186 and a screw 187, attached to a lever 188 having a notch which receives shaft 168 and which is secured to said shaft by a screw 189 (Fig. 8). Counterclockwise rotation of shaft 168 is limited by engagement of a screw 190, adjustable in the lever 188, with a fixed stop 191. Spring 185' and lever 188' in Fig. 9 are parts of a duplicate apparatus for operating upon tubing which is moved along the angle 165' (Fig. 7). During counterclockwise movement of lever 183, switches MS4 and MS5 are respectively opened and closed because the operating plungers 192 and 193 of such switches are engaged by screws 194 and 195 respectively, such screws being adjustable in lever 183 to accurately control the timing of the action of such switches.

Control trigger and associated mechanism

Referring to Figs. 10 and 13, the bars 162 and 163 are spaced from the vertical members 160 by plates 202 and 203. Bars 162 and 163 support a block 204 which is clamped to the bars by a clamp plate 205 into which screws 206 passing through block 204 are threaded, as shown in Fig. 13. Block 204 is provided with a notch 207 in which a bar 208 is positioned and this bar is retained in said notch by a plate 209, which screws 210 attach to block 204. Bar 208 has a threaded hole 211 which receives a screw 212 having a reduced portion 213 received by a notch 215 (Fig. 12) in a plate 216 attached to block 204 by screws 217. The screw 212 has a knurled head 218 by which it can be manually turned to adjust the position of bar 207 horizontally. Bar 208 supports a plate 220 having a projecting part 221 which provides a bearing for a shaft 222 carrying trigger element 223 and a lever 224 which is split at 225 to provide a clamp hub in which the shaft 222 is received and the hub is secured thereto in the desired position of angular adjustment by tightening a clamp screw 226. A screw 227 is threaded in the lever 224 and a link 228 is pivotally connected therewith. The link is also pivotally connected with a screw 229 (Fig. 11) carried by a lever 230 which is pivotally supported on a screw 231 attached to plate 220. A stud 232 extending from lever 230 is pivotally connected by a screw 233 with a link 234 connected by a screw 235 with the armature 236 of a solenoid S4.

By loosening the screws 206, the trigger 223 and its support can be moved horizontally to a desired distance from the cutter. When this distance has been approximately established, the screws 206 are tightened and the screw 212 is turned in order to obtain a fine horizontal adjustment of trigger 223. By virtue of energization of solenoid S4, which moves its armature 236 to the position shown, trigger 223 is located in the position shown to be engaged by tubing moving to the left along angle 165. This movement of armature 236 also causes lever 230 to engage the plunger 237 of switch MS1 to open it. When the tubing engages the trigger 223 and moves it clockwise, lever 230 is moved clockwise and armature 236 is moved to the left to the position shown. As lever 230 moves away from switch plunger 237, a spring in the switch MS1 operates to lose the switch to cause almost instantaneous energization of solenoid S1 (Fig. 1) in a manner to be described.

Switch controls

Referring to Fig. 14, a switch SW1 connects a 440 volt A. C. source with wires H1, H2, H3 and current is supplied to primary p1 of transformer TR1 having a secondary s1 connected by wires L1 and L2 to terminals 5 and 6 to an energy storage unit ES. Switch SW2 is closed to connect wires H1, H2 and H3 with wires H1a, H2a and H3a respectively. The moving tubing strikes the trigger 223 (Fig. 10) and rotates it clockwise. Lever 230 releases plunger 237 and switch MS1 (upper left of Fig. 14) closes to connect battery B1 with terminals 1 and 2 of unit ES. In a manner to be described, a condenser is caused to discharge through terminals 7 and 8 and wires 17 and 18 to solenoid S1 which causes the shear blade to descend and cut the tubing. On the down stroke of the cutter, each of the switches MS2 and MS2' connects wire L1 with wire 10 and coil R1c of relay R1 receives current from wires L1 and L2. Contacts R1a, R1b close to connect wires H1a and H2a with solenoid S2 which retracts the cutter upwardly. The closing of contacts R1d and R1e effects energization of coil 16 of a timer T, switch MS3 having been closed on completion of the up stroke of the cutter. When the timer T times out, switch 15 connects wires 13 and 14 and coil R2c of relay R2 receives current and relay R2 closes its contacts R2a and R2b which connect wires H1a and H3a with solenoid S3 which operates to eject the tubing. Upon the completion of ejection, switch MS4 opens to disconnect wire 11 from wire L1 and coil R1c is open-circuited and relay R1 opens to deenergized solenoid S2 and to open-circuit timer coil 16, whereupon switch 15 disconnects wire 14 from wire 13 and coil R2c is open-circuited and relay R2 opens its contacts to disconnect solenoid S3. Completion of the ejection effects closure of switch MS5 (Fig. 16); and, in a manner to be described, this causes energization of solenoid S4 which resets the trigger 223 which the tubing strikes in order to start the cycle.

Energy storage unit

The energy storage unit ES (Fig. 15) comprises a transformer TR2 having a primary p2 connected with terminals 5 and 6 and a secondary s2, the ends of which are connected with cathode 20 of tube T1 and the center tap of which is connected with wire 21. Grid 22 is connected with condenser C3 connected with wire 21 and with a resistance r3 connected with condenser C2 and a battery B2 connected with wire 21. The plate 23 is connected with a terminal 7. Wire 21 and condenser C2 are connected with secondary s4 of transformer TR4 whose primary p4 is connected with wires 1 and 2.

Wire 21 is also connected with a center tap of secondary s3 of transformer TR3 and the ends of the secondary are connected with rectifiers REC1 which is connected through a resistance r2 with condenser C1 and by wire 28 with terminal a8. Resistance r1 is connected with terminal 8 and with condenser C1.

Primary p3 of transformer TR3 is connected with wire L2 by a manual switch 35 and with wire L1 by a time delay relay TDR having a contact 31 which closes when relay coil 30 is energized. When switch 35 is closed, resistance 32 receives current to heat a bi-metal blade 33 which after a certain time closes contacts 34 to energize coil 30. Therefore, the storage unit does not become effective until the lapse of time sufficient to heat tube T1.

Tube T1 is normally non-conducting and while non-conducting, condenser C1 is charged by the rectifier REC1. When switch MS1 closes to connect battery B1 with terminals 1 and 2, through the transformer primary p4 and the secondary s4, the bias on grid 22 of tube T is so changed that tube T1 becomes conducting and condenser C1 which has been charged to relatively high voltage, for example, 900 volts, discharges suddenly through terminals 7 and 8 and wires 17 and 18 through the cut-off solenoid S1.

*Trip return control*

The trip return control unit shown in Fig. 16 includes switch MS5 which is normally open to disconnect a battery B3 from primary p5 of transformer T5 whose secondary s5 is connected through condenser C6 with grid 40 of tube T2 and by wire 42 with tube cathode 43 and grid 45. The cathode 43 is heated by element 44. Tube T2 is normally biased for non-conduction by battery B4 connected therewith through resistance r5 and with wire 42. Condenser C7 is connected between wire 42 and grid 40.

Wire 42 is connected with variable resistance r4 and condenser C5 which is connected with wire L2. Wire 42 is also connected with plate 50 of tube T3 having a grid 51 connected by wire 52 with cathode 53 heated by element 54. Grid 55 is connected with wiper 56 of variable resistance 56a connected with wire 52 and battery B5. Wire 52 is also connected with wire L2 through variable resistance r8 and coil R3c of relay R3 having normally open contacts R3a for connecting wires L1 and 57.

Wires L1 and L2 are connected with primary p6 of transformer TR6 whose secondary s6 supplies current through connections represented by x, x to the cathode heaters 44 and 54.

A relay R4 has a coil R4c connected with wires L2 and 57 and a normally closed contact R4a for connecting plate 46 of tube T2 with a variable resistance r6 connected with the positive terminal of a condenser C4 connected with wire L2 and a normally open contact R4b for connecting terminal 9 with wire L1 which is connected with the negative terminal of a rectifier REC2 whose positive terminal is connected with the positive terminal of condenser C4.

When, toward the end of tubing ejection, switch MS5 closes, tube T2 is biased for conduction; and condenser C4, which has been charged through the rectifier REC2, discharges through tube T2 and condenser C5 is charged at a rate determined by the circuit parameters. When the voltage of condenser C5 reaches a predetermined value, the tube T3, held hitherto non-conducting by the negative bias applied by battery B5, passes current to coil R3c of relay R3 for a duration of time determined by the charge of condenser C5. Relay R3 closes contacts R3a to energize coil R4c of relay R4 which opens its contact R4a to cause tube T2 to be non-conducting and closes its contacts R4b to L1 through terminal 9 with solenoid S4 (Fig. 14) which operates to reset the trigger 223 (Fig. 10). The apparatus is then in condition for repetition of the operating cycle.

*Advantages and sequence of operation*

Before the operating cycle of the apparatus starts, the trigger 223 is in the position shown in Fig. 10, when it will be engaged by the tubing as it moves from the mill, and the trigger is held in this position by a light force applied by a spring in switch MS1 which urges the plunger 237 upwardly against the lever 230. Therefore, the trigger offers substantially no resistance to movement of the tubing and is very easily moved to disengage the lever 230 from the plunger 237 to start operation of the apparatus. Practically at the instant lever 230 releases the plunger 237 to permit closing of switch MS1 by the aforementioned spring, the condenser C1 (Fig. 15) discharges its energy which is a very substantial amount, being equal to $$\frac{CE^2}{2}$$

E being in the order of 900 volts. As already stated, upon discharge of this condenser, the solenoid S1 is operated to move the shear blade downwardly to cut the tubing.

The downward movement of the shear blade is relatively rapid being at the rate of about 300 feet per second. The time required for movement of the blade to cut off the tubing and return to initial position is approximately .05 second. The time during which the shear blade blocks movement of the tubing from the mill is extremely short, being about .005. For tubing moving from the mill at 25 feet per minute, the shear blade would block movement at the severed end of the tubing while the portion of the tubing leaving the mill would be moving .025 of an inch. For all practical purposes the effect of stopping the tubing to this extent during the cutting operation is negligible. Therefore, the need for moving the cutter bodily with the tubing during the cutting operation is eliminated. Because the cutter can be stationary, greater accuracy of cut off is obtained, on account of reduction in the possibility of mechanical error and the cost of construction and maintenance is reduced.

Since ejection of the severed tube length cannot start until the cut tubing has been moved clear of the cutter frame, the timer T is adjusted to time out after an interval sufficient for this movement, such interval being .167 of a second if the tubing is travelling at the rate of 25 feet per minute. The time required for ejection of the tubing and return of the ejector to its normal inoperative position is approximately .10 of a second. Thus the time for the entire cycle of operation, which includes the time required for the cutting, movement of the cut tube to position for ejection, ejection and return of the ejector to normal, is about .227 of a second.

Greatly improved accuracy and uniformity of tube length is obtained and this is due primarily to the very short time required for the total operational cycle and the fact that the operation of the controls for the several solenoids which actuate the various parts of the apparatus and the operation of the solenoids, themselves, in response to operation of the controls takes place at practically a uniform schedule. Since the trigger 223 is always moved to the same vertical position before the tubing strikes it to initiate the cycle of operation and since the trigger offers substantially no resistance to the movement of the tubing, the switch MS1 is closed each time when the free end of the tubing has moved practically the same distance from the cutter. Since the timing of the electrical control responsive to closing of switch MS1, for causing discharge of the condenser C1 and the timing of the response of solenoid S1 to discharge of condenser C1 are practically unvarying, a great degree of uniformity and accuracy in length of the severed pieces of tubing is effected. Assuming that it might be possible that the cut off time, estimated to be about .005 of a second, could vary as much as plus or minus 5%, the variation in tubing length, when the tubing is travelling at 25 feet per minute, would be only plus or minus .00625 of an inch.

The sequence of operation of the various instrumentalities during the operational cycle is always maintained because the solenoid S2 cannot be energized until the tubing has been cut and, by that time solenoid S2 is free to operate because the energy of the condenser C1 has been dissipated in solenoid S1 which is not energized by the time solenoid S2 is energized. The energization of solenoid S3 is prevented until a certain time has elapsed after retraction of the cutter blade, because during that lapse of time, switch MS3 closes to energize the timer coil 16, the timer T times out to close switch 15 and relay R2 closes. Until such relay closes, solenoid S3 is not energized. Solenoid S4 cannot operate in advance of the completion of ejection of the severed tubing because its energization must wait on closure of switch M5 to initiate the operative cycle of the trip return control unit shown in Fig. 16. Completion of ejection results in opening of relays R1 and R2 and resetting of the timer T so that the apparatus is restored to its normal initial status well in advance of engagement of the uncut tubing with the trigger 223 to initiate a cycle of operation. Engagement of the tubing with the trigger does not take place before return of said trigger to its vertical position because the total operational time cycle is much less than the time required for the tubing to pass through the cutter which is necessary to trip the trigger and initiate the cycle of operation. If the total time of the operational cycle were ¼ second, the length of tubing passed through the cutter during such cycle would be only 1¼ inches long. Obviously it would be impractical to use the present apparatus to cut such short lengths of tubing since it is apparent that the minimum length of the cut tubing is limited due to the fact that the tubing must move a considerable distance from the cutter to the ejector.

Summary

From the foregoing, it is apparent that the present invention includes an electrical energy storage device ES including condenser C1 and means for charging it, a cutter blade advancing solenoid S1, a trigger 223 to be engaged by moving tubing, means rendered effective (through closure of switch MS1) in consequence of movement of the trigger by the tubing, for causing release of energy from condenser C1 to the solenoid S1 to effect cutter blade advancement, a cutter blade retracting solenoid S2, means (relay R1) rendered effective (through closure of switch MS2) in response to cutter blade advancement, for connecting solenoid S2 with a current source to effect retraction of the cutter blade, a cut-tubing ejecting solenoid S3, means for effecting (through closure of switch MS3, timing out of timer T and closing of relay R2) the connection of solenoid S3 with a current source, a predetermined time after retraction of the cutter blade, a trigger restoring solenoid S4, and means for effecting energization of solenoid S4 in response to completion of ejection. In response to completion of ejection, solenoids S3 and S2 are de-energized by virtue of momentary opening of switch M4 which results in opening of relay R1, which results in de-energizing timer coil 16 and resetting the timer, the opening of switch 15 and the opening of relay R2.

While the embodiment of the present invention as herein disclosed, constitutes a preferred form, it is to be understood that other forms might be adopted.

What is claimed is as follows:

1. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, means operable in response to movement of the trigger element by the tubing to effect operation of the cutting blade to sever the tubing, means rendered effective by completion of the cutting stroke of said blade for retracting said blade to its initial position, means for ejecting the cut tubing after the return of the blade, means operable by retraction of the cutting blade to its initial position to cause operation of the ejecting means, and timing means for delaying operation of the ejecting means until the cut length of tube has been moved to a position to be engaged by said ejecting means.

2. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, means operable in response to movement of the trigger element by the tubing to effect operation of the cutting blade to sever the tubing, means rendered effective by completion of the cutting stroke of said blade for retracting said blade to its initial position, means for ejecting the cut tubing after the return of the blade, means operable by retraction of the cutting blade to its initial position to cause operation of the ejecting means, timing means for delaying operation of the ejecting means until the cut length of tube has been moved to a position to be engaged by said ejecting means and means operable in response to operation of the ejecting means for restoring the trigger element to normal position after the cut length of tubing has been ejected.

3. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid and means for ejecting the cut tubing by restoration of the cutting blade to normal position.

4. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid, means for ejecting the cut tubing by restoration of the cutting blade to normal position, a third solenoid for operating said ejecting means, a switch for controlling said solenoid and means operable to close said switch to effect energization of said third solenoid by restoration of the cutter blade to its normal position.

5. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid, means for ejecting the cut tubing by restoration of the cutting blade to normal position, a third solenoid for operating said ejecting means, a switch for controlling said solenoid, means operable to close said switch to effect energization of said third solenoid upon restoration of the cutter blade to its normal position and timing means for delaying operation of the ejecting means until after the cut tubing has been moved to a position to be engaged by said ejecting means.

6. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid, means for ejecting the cut tubing by restoration of the cutting blade to normal position, a third solenoid for operating said ejecting means, a switch for controlling said solenoid, means operable to close said switch to effect energization of said third solenoid upon restoration of the cutter blade to its normal position and timing means for delaying energization of said third solenoid after closing of said last named switch until the cut tubing has been moved to a position to be engaged by said ejecting means.

7. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid, means for ejecting the cut tubing by restoration of the cutting blade to normal position, a third solenoid for returning the trigger element to normal position, a switch adapted when closed to effect energization of said third solenoid and means operable by the tube ejecting means to close said last named switch after ejection of the cut length of tubing.

8. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid, means for ejecting the cut tubing after restoration of the cutting blade to normal position, a third solenoid for operating said ejecting means, means operable to effect energization of said third solenoid upon restoration of the cutting blade to its normal position, a fourth solenoid for returning the trigger element to normal position, a third switch for deenergizing said third solenoid when opened, a fourth switch for effecting energization of said fourth solenoid when closed, and means operable by the ejecting means upon completion of the ejecting function to open said third switch and close said fourth switch.

9. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a solenoid for operating said cutting blade to sever the tubing, a switch operable by the trigger element when moved by the tubing to effect energization of said solenoid, a second solenoid for restoring the cutting blade to its initial position after the tubing is cut, a switch adapted to be closed at the completion of the cutting stroke in order to energize said second solenoid, means for ejecting the cut tubing after restoration of the cutting blade to normal position, a third solenoid for operating said ejecting means, a third switch for effecting energization of said solenoid when closed, means operable to close said switch upon restoration of the cutting blade to normal position, a fourth solenoid for returning the trigger element to normal position, a fourth switch effective when open to de-energize said third solenoid independently of said third switch, a fifth switch for effecting energization of said fourth solenoid, and means operable by said ejecting means upon completion of the ejecting operation to open said fourth switch and close said fifth switch.

10. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a pivoted lever connected with said cutting blade and operable to move said blade to sever the tubing, a solenoid for operating said lever, a switch operable in response to movement of said trigger element by the tubing to effect energization of said solenoid, a second solenoid connected to said lever and operable when energized to restore the cutting blade to normal position, and a switch operable by said lever at the completion of the cutting stroke of said blade to effect energization of said second solenoid.

11. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, a pivoted lever connected with said cutting blade and operable to move said blade to sever the tubing, a solenoid for operating said lever, a switch operable in response to movement of said trigger element by the tubing to effect energization of said solenoid, a second solenoid connected to said lever and operable when energized to restore the cutting blade to normal position, a switch operable by said lever at the completion of the cutting stroke of said blade to effect energization of said second solenoid, means for ejecting the cut lengths of tubing after the cutting operation and means operable by said lever upon completion of the restoration of the cutting blade to normal position to cause operation of said ejecting means.

12. Apparatus for cutting tubing into lengths while continuously moving the tubing longitudinally, including a stationary cutter unit having a cutting blade past which the tubing is moved longitudinally, a trigger element normally located in the path of movement of the tubing and adapted to be engaged and moved thereby as the tubing is moved, means operable in response to movement of the trigger element by the tubing to effect operation of the cutting blade to sever the tubing, means rendered effective by completion of the cutting stroke of said blade for retracting said blade to its initial position, means for ejecting the cut tubing after the return of the blade, a switch for controlling the operation of said ejecting means, means operable upon restoration of the cutting blade to normal position to close said switch, a relay switch which must also be closed to effect operation of said ejecting means and a time lag device operable to prevent closing of said relay switch until the cut length of tubing has been moved to a position to be engaged by said ejecting means.

(References on following page)

References Cited in the file of this patent

UNITED STATES PATENTS

| | | |
|---|---|---|
| 482,917 | Dix | Sept. 20, 1892 |
| 1,296,656 | Hamm et al. | Mar. 11, 1919 |
| 1,318,320 | Frohn | Oct. 7, 1919 |
| 1,367,513 | Mann | Feb. 1, 1921 |
| 1,407,712 | Stevens et al. | Feb. 28, 1922 |
| 1,416,211 | Jupp | May 16, 1922 |
| 1,719,621 | Pearne et al. | July 2, 1929 |
| 1,800,005 | Braun | Apr. 7, 1931 |
| 1,923,751 | Schrier et al. | Aug. 22, 1933 |
| 2,480,781 | Simpson | Aug. 30, 1949 |
| 2,528,779 | Pinney | Nov. 7, 1950 |
| 2,540,166 | Frank et al. | Feb. 6, 1951 |
| 2,553,189 | Hahn | May 15, 1951 |
| 2,582,025 | Frank et al. | Jan. 8, 1952 |